United States Patent [19]

Shernoff

[11] Patent Number: 4,877,311

[45] Date of Patent: Oct. 31, 1989

[54] LASER POWER MONITORING OPTICS FOR A RING LASER GYROSCOPE

[75] Inventor: Donald I. Shernoff, White Plains, N.Y.

[73] Assignee: Kearfott Guidance & Navigation Corporation, Wayne, N.J.

[21] Appl. No.: 145,021

[22] Filed: Jan. 19, 1988

[51] Int. Cl.⁴ ............................................. G01C 19/64
[52] U.S. Cl. ...................................................... 356/350
[58] Field of Search ........................... 356/350; 372/94

[56] References Cited

U.S. PATENT DOCUMENTS

| 4,152,072 | 5/1979 | Hutchings | 356/350 |
| 4,514,087 | 4/1985 | Vescial | 356/350 |
| 4,514,832 | 4/1985 | Vescial | 356/350 |
| 4,677,641 | 6/1987 | Podgorski | 372/94 |

Primary Examiner—Vincent P. McGraw

[57] ABSTRACT

Instead of using two power monitoring photodiodes and associated summing circuitries for adding the power of the laser beams circulating in the cavity of a ring laser gyro, the present invention eliminates one of the photodiodes and uses, in its stead, reflective means for directing both of the laser beams onto the remaining power monitoring photodiode, which automatically measures and sums the light intensities or power from the laser beams and provides as an output the thus added power directly to the necessary electronic circuitry to maintain constant the pathlength of the cavity.

10 Claims, 4 Drawing Sheets

LASER POWER MONITORING OPTICS FOR A RING LASER GYROSCOPE

FIELD OF THE INVENTION

The present invention relates to ring laser gyroscopes and more particularly to an assembly for monitoring the power of the laser beams circulating within a cavity along one axis of the gyroscope.

BACKGROUND OF THE INVENTION

In a ring laser gyroscope (RLG), to obtain accurate inertial rotation information, a constant pathlength has to be maintained. To do so, U.S. Pat. No. 4,320,094 teaches the use of an electronic circuit for calculating the respective power of the circulating light beams in the cavity of a RLG. The power thus calculated is then used to modulate a piezoelectrically activated movable mirror assembly for maintaining the pathlength constant. In copending application Ser. No. 034,377, filed on Apr. 6, 1987 and assigned to the same assignee of the instant invention, a polyhedron having three facets including one for a fringe photodetector and the remaining two for power monitoring photodiodes is disclosed. There, it was taught that in order to control the movement of the piezoelectric transducer for maintaining constant pathlengths for the gyroscope, the light intensities of the respective laser beams have to be measured and summed by the corresponding power monitoring photodiodes. Yet, in applications such as inertial guidance of missiles, aircraft, tanks, etc., space for the placement of a RLG is at a premium. Consequently, the size of the RLG needs to be reduced.

SUMMARY OF THE PRESENT INVENTION

The present invention successfully eliminates a good portion of the space needed for a RLG, such as that mentioned in the aforenoted copending application, by replacing one of the power monitoring photodiodes, on one facet of the beam combiner, with a reflective means such as a mirror so that the laser beam that was originally detected by the now eliminated photodiode can be reflected onto the remaining power monitoring photodiode. The remaining photodiode then automatically measures and sums the light intensities of the respective laser beams so that an indication of the total power of the beams is provided as feedback to the pathlength controller. Since the power of the respective laser beams are now summed automatically, the present invention assembly further eliminates the need for the summing circuit that is used in conventional RLGs.

It is thus an objective of the instant invention to provide for the monitoring of the power of the circulating laser beams in a cavity of a RLG by using only one power monitoring photodiode.

It is another objective of the present invention to reduce the costs of monitoring the power of the laser beams by reducing, by one-half, the photodiodes needed.

It is yet a third objective of the present invention to further reduce costs by eliminating the wiring needed for the eliminated photodiode.

It is yet a further objective of the present invention to eliminate the summing circuitry needed, up to this time, for combining the power from the respective power monitoring photodiodes.

BRIEF DESCRIPTION OF THE DRAWINGS

The above-mentioned objects and advantages of the present invention will be more clearly understood when considered in conjunction with the accompanying drawings, wherein.

DETAILED DESCRIPTION OF THE PRESENT INVENTION

Figure 1:
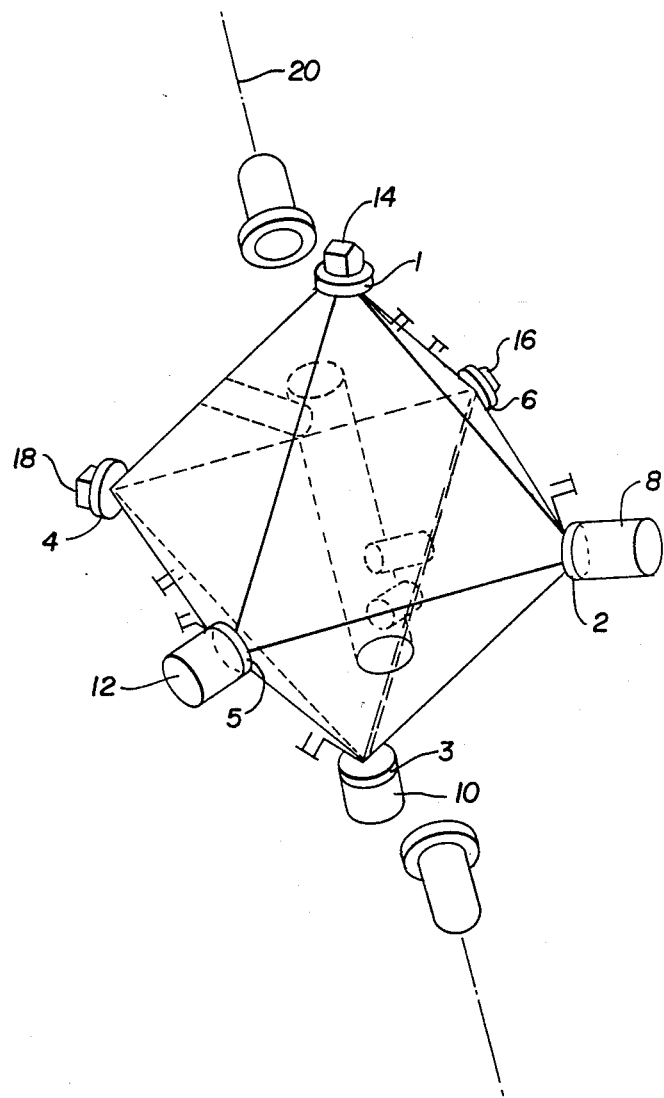
FIG. 1 is a schematic perspective view of a prior art monolithic ring laser gyroscope assembly.

Referring to FIG. 1, a schematic illustration of a monolithic three axis RLG (gyro) assembly is shown. Mirrors 1 to 6 are respectively positioned in the center of each body face. The cube is machined such that a small diameter bore connects adjacent mirrors. A closed optical cavity is defined between four mirrors which are placed in one plane and are interconnected by bores. Thus, a total of three optical cavities are defined by the mirrors as follows: 2, 5, 4, 6; 1, 5, 3, 6; and 1, 2, 3, 4. The space within these cavities is filled with a helium-neon gas mixture which causes lasing due to well known principles.

As shown, there are three mutually orthogonal beam paths in FIG. 1. Each of the beam paths serves to detect angular rotation about a separate axis. These beam paths may be defined by the optical cavities which are mentioned above between mirrors 2, 5, 4 and 6; 1, 5, 3 and 6; and 1, 2, 3 and 4. In essence, each mirror is incorporated in the beam path of two orthogonal planes. Putting it anothr way, each mirror is utilized for two orthogonal RLGs respectively associated with two separate axes.

Further shown in FIG. 1 are piezoelectric transducers 8, 10 and 12, coupled to mirrors 2, 3 and 5 respectively. The operation of these piezoelectric transducers is well known and it is further known that these transducers can modulate the corresponding pathlengths of the respective RLGs (by flexing the corresponding mirrors) such that a constant pathlength is maintained for each RLG (one for each axis) in the gyro assembly. See U.S. Pat. No. 4,329,974 by Ljung, assigned to the same assignee as the instant invention.

As is usual in RLGs, each RLG has laser light waves propagating in opposite directions. Any frequency difference in these two light waves represents an inertial rotation. In order to avoid the "lock-in" effect, the monolithic assembly is dithered about axis 20, equally shared by the three RLGs.

Also shown in FIG. 1 are beam combiners 14, 16 and 18, associated respectively with mirrors 1, 4 and 6. These beam combiners generate fringe patterns, one for each axis, for the gyro assembly. As is well known, by measuring the fringe patterns, the inertial orientation of the gyro assembly can be ascertained. Such an assembly has been described in U.S. Pat. No. 4,477,188 by Stiles, et al., assigned to the same assignee as the instant invention.

To maintain the pathlength of a RLG, the summed power of the respective laser beams has to be demodulated and integrated before being fed to a transducer, such as 8. The demodulator (not shown) is driven by a reference oscillator (also not shown), the frequency of which is also used to capacitively drive the transducer, which is constantly modulated and moved so as maintain a constant pathlength for the RLG.

A method of using the output of a fringe pattern detector for calculating the summed power is given in the aforenoted '974 patent. However, as disclosed therein, such a method requires extensive electronic circuitries.

Figure 2A:
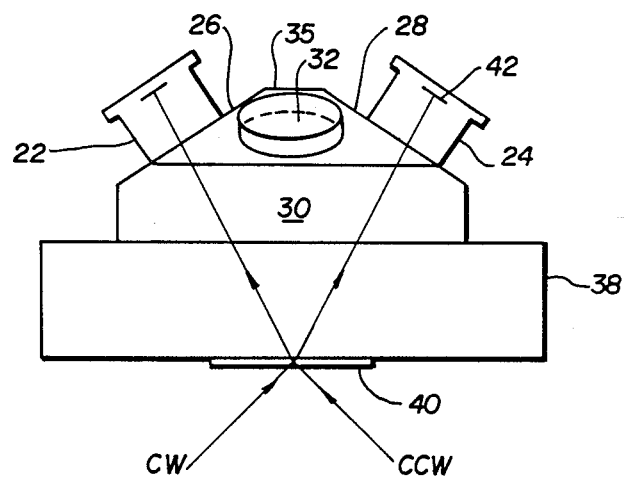
FIG. 2A is a cross-sectional view of a polyhedron beam combiner disclosed in the '377 copending application.
Figure 2B:
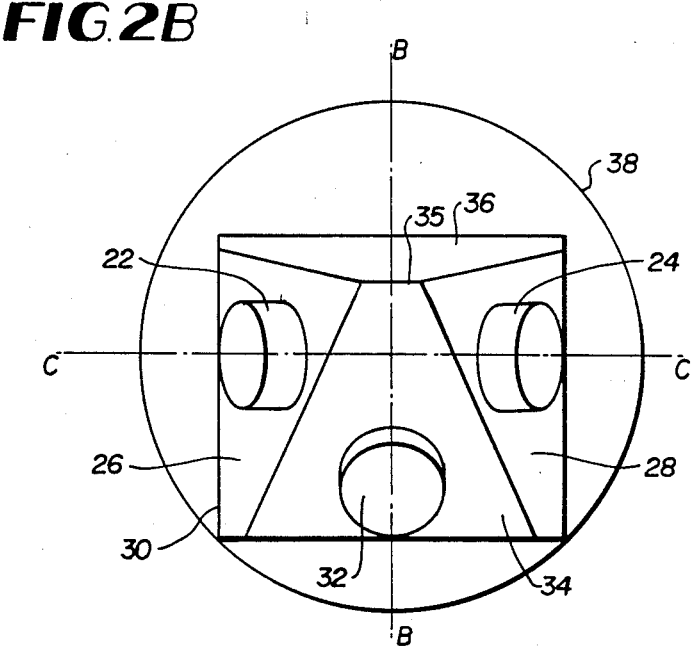
FIG. 2B is a top view of the FIG. 2A polyhedron beam combiner.

In the '377 copending application, it is taught that separate power monitoring photodetectors (or photodiodes) for measuring corresponding light intensities (or power) of the laser beams are used. As shown in FIGS. 2A and 2B, in the '377 copending application, a pair of power monitoring photodiodes 22 and 24 are mounted on facets 26 and 28, respectively, of a beam combiner prism 30. A fringe pattern photodetector (photodiode) 32 is shown to be mounted on a facet 34 connecting facets 26 and 28. In addition to the three facets, the prism beam combiner of FIGS. 2A and 2B has an additional facet 36, shown in FIG. 2B. All of these facets— that is, facets 26, 28, 34 and 36—converge upward to a flat apex 35, which, as can be seen, is formed by the meeting of facets 34 and 36. Also to be noted is that apex 35 actually separates the respective apices of facets 26 and 28. It can readily be seen that facets 26 and 28 slope symmetrically downward from apex 35 toward a plane coplanar with mirror 40.

Referring to FIG. 2A, it can be seen that the two laser beams circulating in the cavity of the RLG (any one of the three RLGs of FIG. 1), designated as clockwise CW and counterclockwise CCW, are separated by the beam combiner 30 and fed to power monitoring photodetectors 22 and 24, respectively, from whence the light intensities of the beams are measured and summed, per the teachings in the '974 patent.

It should be appreciated that beam combiner 30, as shown in FIG. 2A, is mounted on a light transmissive block 38 which often is considered as a mirror block, since it is coated with a coating 40 that ordinarily allows a certain fraction of the laser beams, for example 0.0001, to pass through to the photodetectors. For the purpose of this invention, coating 40 is considered to be a mirror. In addition, it should be appreciated that the power monitoring photodiodes may be PIN photodetectors, which may have, for instance, a photocathode 42 upon which the laser beam impinges. See FIG. 2A. This photocathode may have more than one segment but, for the purpose of power monitoring, only one segment is needed. Suffice it to say, then, that by using these photodetectors, the power of the laser beams can be directly measured.

Figure 3:
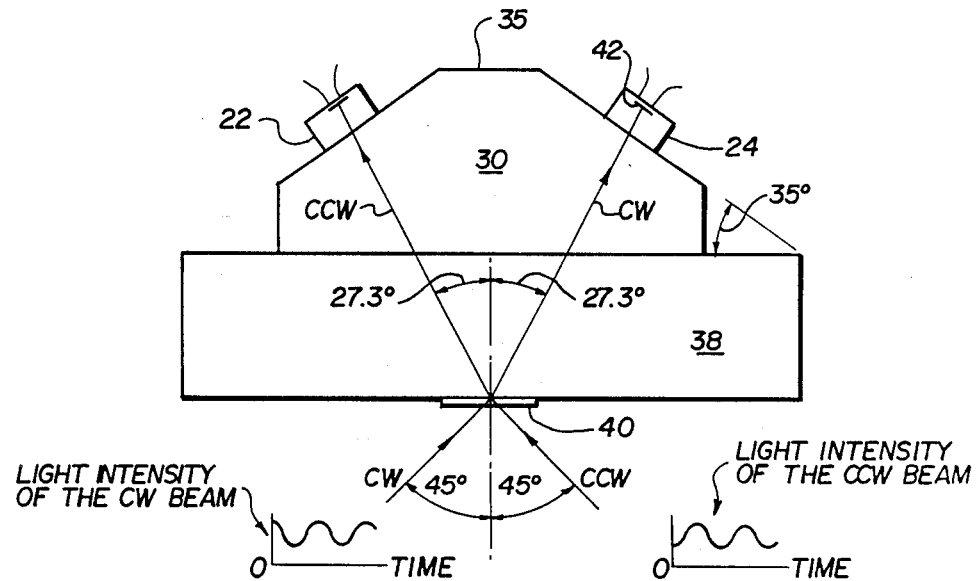
FIG. 3 is a simplified view of the FIG. 2A polyhedron beam combiner.

Referring to FIG. 3, there is shown a simplified view of the FIG. 2A beam combiner. For this figure, there is shown, for the two counterpropagating beams CW and CCW, that there is for each beam a constant and a time-varying component. The time-varying components of the two beams have a phase shift of 180° with respect to each other. Otherwise the two beams are identical. The CW and CCW designations for the rotating beams are arbitrary and the beams shown in the figures may actually be labelled differently. And as shown by the waveforms of the respective light intensities of the beams, the sum of the two beams provides a sensitive and accurate measure of the total laser power. For the axis of the RLG assembly under consideration, as was mentioned before, the summed power from the two beams is used in a feedback circuit to control the pathlength of the optical cavity, in order the maintain the laser beams at maximum power. Further shown in FIG. 3 are the different angles, with respect to the beams, when the beams impinge or strike mirror 40 and pass through transmissive block 38 and beam combiner 30.

Figure 4:
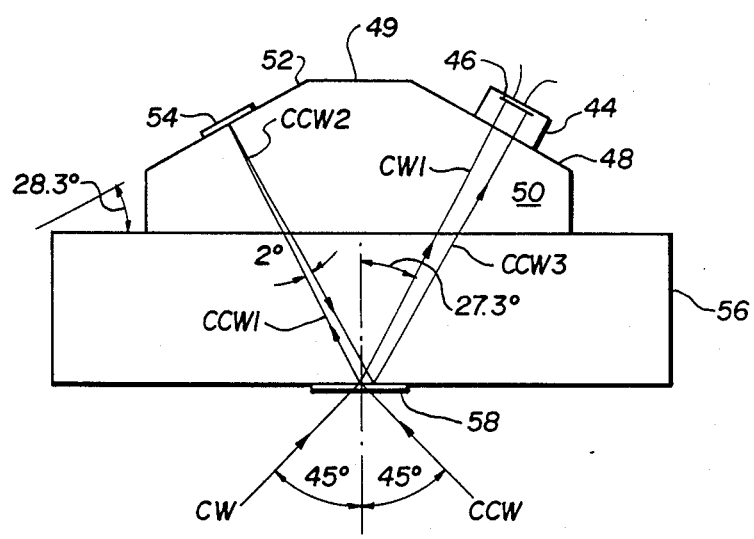
FIG. 4 is a simplified cross-sectional view illustrating a first embodiment of the present invention.

Refer now to FIG. 4 where there is shown a crosssectional view of a polyhedron prism beam combiner which has only one power monitoring photodetector. As shown, a photodetector 44 with a photocathode 46 is mounted on a first facet 48 of a beam combiner 50. On a facet 52 opposite to facet 48, and separated by a flat apex 49, a mirror 54, or more precisely a coating, is mounted. As was before, beam combiner 50 is mounted on a light transmissive block (or substrate) 56 which is preferably made of the material Zerodur or some other material with similar optical and mechanical properties. On the underside of substrate 56 a coating mirror 58 is attached. Also, as was discussed with respect to FIGS. 2A and 2B, facets 48 and 52, as shown, slope symmetrically downward from apex 49 toward a plane coplanar with mirror 58.

In operation, the counterpropagating laser beams CW and CCW strike and refract through mirror 58, substrate 56 and beam combiner 50 to either mirror 54 or photodetector 44. In the case of the CW beam, it can be seen that this beam is refracted as CW1 and directly impinges photocathode 46 of photodetector 44. On the other hand, beam CCW is refracted as CCW1 toward mirror 54 which, upon intercepting beam CCW1, reflects the same as beam CCW2 to mirror 58. It should be appreciated at this point that mirrors such as 58 that would allow light to enter at one surface thereof and yet reflect light at its back surface are well known. Accordingly, beam CCW2, upon striking mirror 58, is reflected as beam CCW3 to photocathode 46 of photodetector 44.

As was discussed previously, power monitoring photodetector 44 is capable of measuring the light intensity of the repective light beams and automatically summing the power of these beams. Thus, the summed power is provided as an output from photodetector 44 to well known electronic circuitry, per the ones shown in the '974 patent, which no longer needs to have a summing circuit. From this discussion, it can be seen that aside from eliminating a photodetector and the wiring for connecting the photodetector to the appropriate circuitries, the summing circuitry which was earlier needed is also eliminated. Consequently, the resulting assembly may be compacted and therefore be fitted into a smaller space.

Continuing with FIG. 4, it can be seen that there is a slight angle, such as two degrees, introduced between beams CCW1 and CCW2. In other words, mirror 54 does not provide for perfect retro-reflection. The reason for this is that were beam CCW1 perfectly reflected, it would reenter the laser cavity and interfere with the operation of the laser beams. Therefore, instead, beam CCW1 is reflected toward mirror 58, as CCW2, at a slight angle which will not be critical as long as it can still be intercepted, as beam CCW3, by photodetector 44. To change the angle between beams CCW1 and CCW2, the angle of facet 52 may be changed. But for the purpose of this invention, such angle is not critical.

Figure 5:
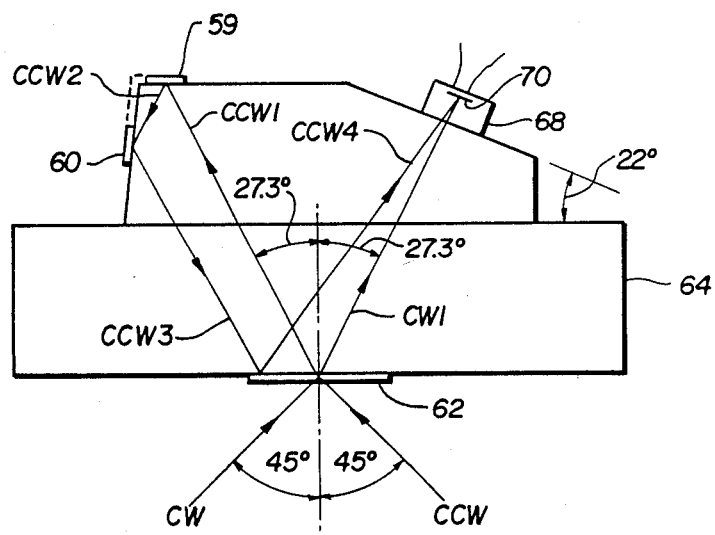
FIG. 5 is an illustration of a second embodiment of the present invention.

A second embodiment of the invention is shown in FIG. 5. There, two reflective surfaces, designated by mirrors 59 and 60, are shown. For the FIG. 5 geometry, the counterpropagating laser beams CW and CCW, as discussed previously, strike and refract through mirror 62, and pass through substrate 64 and beam combiner 66 to the photodetector 68 (and its photocathode 70) and mirror 59, respectively. For this embodiment, the CW beam is, like before, refracted through mirror 62 and directly impinges upon photocathode 70 as CW1. The CCW beam, however, is refracted from mirror 62, as CCW1, and strikes mirror 59, before being reflected thereby as CCW2 to mirror 60. From mirror 60, the beam is reflected as CCW3 back to mirror 62, albeit at a different area thereof from the area from whence the beam CCW was originally refracted. From mirror 62 the beam is reflected as CCW4 toward photocathode 70 at a point (or area) thereon coincident with beam CW1.

From the FIG. 5 illustration, it can be seen that by using mirrors 59 and 60, the beams—particularly the CCW beam, can be displaced in a controlled fashion such that both CW and CCW beams are brought to a coincident point on photocathode 70 of photodetector 68. Thus, the use of two reflective surfaces would permit the controlling of the beams such that a smaller photodetector may be used. This in turn provides for the opportunity to have a monitor assembly that can be smaller than that discussed in FIG. 4, as a smaller photodetector may be used. In fact, as shown, if the placement of the beams may be so controlled, a photodetector which has a very small photocathode area would be sufficient.

One more point needs to be made with respect to the FIG. 5 embodiment. That is, mirrors 59 and 60 may actually be comprised of a continuous corner mirror such as that indicated by the dotted line connecting mirrors 59 and 60. In fact, as long as mirrors 59 and 60 are substantially at 90° from each other (keeping in mind that beam CCW3 should not be reflected back to mirror 62 at the same position as beam CCW1), both CW and CCW beams can be brought together at the photodetector which, as should be noted, rests on a facet which is roughly normal to the beams as they are respectively refracted through and reflected from mirror 62.

Figure 6:
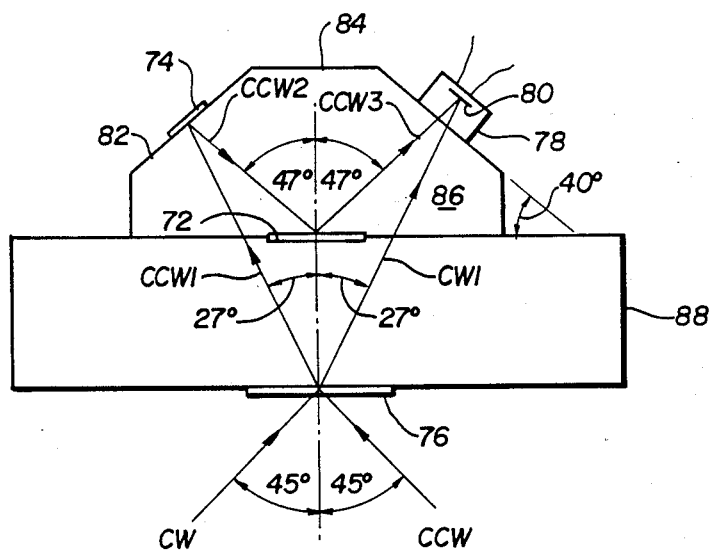
FIG. 6 is an illustration of a third embodiment of the present invention.

Yet a third embodiment is shown in FIG. 6. Like the embodiment shown in FIG. 5, the FIG. 6 embodiment also utilizes two additional reflective surfaces, designated as 72 and 74. For the FIG. 6 embodiment, the CW and CCW beams are again refracted through mirror 76 and directly impinge on photodetector 78 and mirror 74 as CW1 and CCW1, respectively. As shown, mirror 74 is mounted on a facet 82 which is separated from the facet onto which photodetector 78 is mounted by an apex 84, defined in the same manner as apices 35 and 49 of FIGS. 2B and 4, respectively. Upon striking mirror 74, beam CCW1 is reflected thereby, as CCW2, toward mirror 72. From there, the beam is further reflected as CCW3 toward photocathode 80 of photodetector 78. Like the FIG. 5 embodiment, the use of mirrors 72 and 74 gives the FIG. 6 embodiment good control of the placement of the two beams on the photocathode of the photodetector. Like before, the mirrors 72, 74 and 76 are coated onto the different portions of the assembly. For mirror 72, it should be appreciated that this mirror may be coated either onto beam combiner 86 or light transmissive substrate 88. In any event, it should be appreciated that the mirrors as shown in all of the figures have been exaggerated for the sake of clarity since they, in actuality, are comprised of coatings deposited onto the respective surfaces. The FIG. 6 embodiment, like the FIG. 5 embodiment, since the beams can be controlled to impinge on a coincident point, can also use a photodetector smaller than that of the FIG. 4 embodiment.

From the FIGS. 5 and 6 embodiments, it should be appreciated that if it is desired to converge the beams onto a coincident point of a photodetector, two mirrors are needed. And depending on the geometry of the beam combiner, these mirrors may be placed at different facets thereof. However, it should further be appreciated that additional mirrors may be used. Yet it must be remembered that the use of additional mirrors would only make the invention more complicated, without making it work any better.

Inasmuch as the present invention is subject to many variations, modifications and changes in detail, it is intended that all matter described throughout this specification and shown in the accompanying drawings be interpreted as illustrative only and not in a limiting sense. Accordingly, it is intended that the invention be limited only by the spirit and scope of the appended claims.

I claim:

1. In a ring laser gyroscope assembly having a plurality of mirrors, a monitor assembly for monitoring the power of two laser beams circulating in a cavity along one axis of the gyroscope assembly, the monitor assembly comprising:

beam combiner means including multiple facets mounted on a light transmissive block, the light transmissive block having a mirror means attached coplanarly to a surface thereof opposite the surface onto which the beam combiner means is mounted, the laser beams circulating within the cavity striking and refracting through the mirror means;

photodetector menas mounted on a first facet of the beam combiner means for directly intercepting one of the beams refracting thorugh the mirror means, the photodetector means measuring the power of the directly intercepted beam; and reflective means mounted on a second facet of the beam combiner means for intercepting the other of the beams refracting through the mirror means, and for reflecting the thus intercepted other beam back to the mirror means, the mirror means reflecting the reflected other beam toward the photodetector means;

wherein the photodetector means, upon impingement thereat of the twice reflected other beam, measures the power of the other beam and sums the same with the measured power of the directly intercepted beam; and wherien the second facet is so angled that the reflective means mounted thereon reflects the other beam back to the mirror means at a position thereat which is different from the position at which it and the directly intercepted beam refracted through so that the directly intercepted beam and the other beam strike said photodetector means at diverging angles.

2. The assembly according to claim 1, wherein the photodetector means comprises at least one photocathode upon which the laser beams impinge, the directly intercepted beam and the twice reflected beam impinging the photocathode at different portions thereof.

3. The assembly according to claim 1, wherein the beam combiner means comprises a prism including an apex separating the first and second facets, the apex positioned in parallel spaced relation to the mirror means, the first and second facets symmetrically sloping downward from the apex toward a plane coplanar with the mirror means.

4. The assembly according to claim 1, wherein the photodetector means is a photodiode.

5. The assembly according to claim 1, wherein the mirror means is a laser mirror.

6. In a ring laser gyroscope assembly having a plurality of mirrors, a monitor assembly for montioring the power of two laser beams circulating in a cavity along one axis of the gyroscope assembly, the monitor assembly comprising:
  beam combiner means including multiple facets mounted on a light transmissive block having a mirror means upon which the laser beams circulating within the cavity strike and refract through;
  photodetector means mounted on a first facet of the beam combiner means for directly intercepting one of the beams refracting through the mirror means, the photodetector means measuring the power of the directly intercepted beam; and
  first reflective means mounted on a second facet of the beam combiner for intercepting the other of the beams refracting through the mirror means, and for reflecting the intercepted other beam to a second reflective means mounted on a third facet of the beam combiner;
  wherein the second reflective means reflects the twice reflected other beam back to the mirror means, the mirror means reflecting the twice reflected other beam to the photodetector means at a converging angle with respect to the directly intercepted beam;
  wherein the photodetector means, upon receipt of the thrice reflected other beam, measures the power of the thrice reflected other beam and sums the same with the measured power of the directly intercepted beam; and
  wherein the photodetector means comprises at least one photocathode upon which the directly intercepted beam and the thrice reflected other beam impinge, the beams converging onto a coincident area on the photocathode.

7. The assembly according to claim 6, wherein the first and second reflective means comprise a unitary right corner mirror.

8. The assembly according to claim 6, wherein the mirror means is a laser mirror and wherein the other beam reflected by the second reflective means impinges onto the laser mirror at an area different from the area from whence the laser beams circulating along the cavity refracted through.

9. In a ring laser gyroscope assembly having a plurality of mirrors, a monitor assembly for monitoring total power of two laser beams circulating in a cavity along one axis of the gyroscope assembly, the monitor assembly comprising:
  beam combiner means having multiple facets mounted onto a light transmissive block, the light transmissive block including a mirror means attached to a surface thereof opposite the surface onto which the beam combiner means is mounted, the laser beams circulating within the cavity striking and refracting through the mirror means;
  photodetector means mounted on a first facet of the beam combiner means for directly intercepting one of the beams refracting through the mirror means, the photodetector means measuring the power of the directly intercepted beam; and
  first reflective means mounted on a second facet of the beam combiner means for intercepting the other of the beams refracting through the mirror means, and for reflecting the thus intercepted other beam to a second reflective means positioned at the junction where the beam combiner means is mounted onto the light transmissive block, the second reflective means reflecting the thus reflected other beam to the photodetector means;
  wherein the phtodetector means, upon the impingement thereat of the twice reflected other beam, measures the power of the twice reflected other beam and sums the same with the measured power of the directly intercepted beam;
  wherein the second reflective means is positioned in parallel spaced relation with the mirror means; and
  wherein the photodetector means comprises at least one photodiode upon which the directly intercepted beam and the reflected other beam converge onto a coincident area thereof.

10. The assembly according to claim 9, wherein the beam combiner means comprises a prism including an apex separating the first and second facets, the first and second facets symmetrically sloping downward from the apex toward a plane coplanar with the second reflective means.

* * * * *